standard curve r-BHC concentration in water

Solubilities of coated BHC pellets and uncoated BHC pellets in water

Cross Section of Neubauer Pots showing soil, fertilizer and seeds explopyed.

United States Patent Office 3,475,154
Patented Oct. 28, 1969

3,475,154
PLURAL COATED PELLET FORM PRODUCTS
AND PROCESS OF MAKING
Haruhiro Kato, Tokyo, Japan, assignor to Dai Nippon
Toryo Kabushiki Kaisha, Konohana-ku, Osaka-shi, and
Mitsubishi Kasei Kogyo Kabushiki Kaisha, Chiyoda-ku,
Tokyo, Japan, both corporations of Japan
Filed Nov. 30, 1965, Ser. No. 510,572
Claims priority, application Japan, Nov. 30, 1964,
39/66,982
Int. Cl. B44d 1/16
U.S. Cl. 71—64                                    9 Claims

ABSTRACT OF THE DISCLOSURE

A process for producing a coating on pellets to render the pellets low in water solubility, in which the pellets are coated with a heated and softened liquid substance containing thermoplastic and thermosetting resins, whereafter the thus coated pellets, while still hot and soft are covered with a powdered thermoplastic or thermosetting resin, having a particle size smaller than that of the pellets whereby the pellets are coated with the first and second layers and are separated from one another. The thus coated and separated pellets are immersed into a heated liquid containing thermoplastic resins or waxes, whereby the powder layer is melted or cured to form a uniform coating and at the same time, a third layer composed of the heated liquid is formed on the uniform coating. Finally, the pellets while unsolidified and hot, are deposited onto a centrifugal rotary plate, thereby to dry the still liquid third layer and separate the pellets from one another.

---

Figure 1:
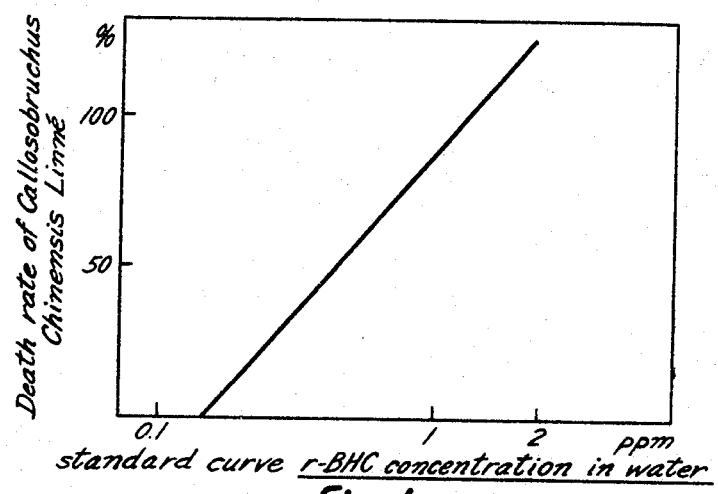

The present invention relates to a process for preparing coated pellet form products, and more particularly, coated pellet form products having low water-solubility and antihygroscopic properties.

Although mixed fertilizers containing ammonium nitrate and/or urea have various excellent properties, they are inconvenient to store, pack, transport or handle owing to their intense hygroscopicity, deliquescency or water-solubility, and more over, after fertilization the greater parts of the fertilizer are readily leached and only a small portion is available to the plants, the rest being wasted ineffectively.

In plants, various kinds of opportune nutrients are required in accordance with the growth, harvesting and the like, and, it is well known that different kinds of nutrients must be given according to the requirements.

In respect of coating the fertilizer, a procedure is described in Japanese Patent No. 13,800 (1964). However, no completely controlled release has been obtained by this method, where in order to regulate the rate of disintegrating in water, the rate of dispersing in water, the pellet form agricultural chemicals are rendered less soluble by controlling the percentage of the composition, or adjusting the diameter of the pellet.

Many investigations have been attempted for improved antihygroscopicity by coating various pellet form compositions, see for instance, the description in respect of the granulated fertilizer in Japanese Patent No. 15,832 (1962).

The known process in respect of the granulated fertilizer are briefly as follows:

By coating granulated fertilizer with lime or various kinds of pigments using a coating machine such as a coating pan or a rotary coating machine, or alternatively, by spraying vinylacetate polymer emulsion having various pigments previously added on the fertilizer to form a film on the surface, wherein the amounts of the emulsion used is about 1% (based on the fertilizer weight), antihygroscopic granulated fertilizer is produced.

The fertilizer granules produced by the ordinary process are slightly effective to improve the hygroscopic and deliquescent properties, while being ineffective to contribute to the maintenance of the activity as plant nutrients. Furthermore, the pellet form agricultural chemicals obtained in such process are not effective for the maintenance of the fertilizer stability. In order to maintain the said activity with the known method, an undesirable coating process must be repeated to obtain uniform heavy coatings.

Also, with the known method, it is impossible for applying liquid and sticky resins on the pellet form compounds. That is, when coating organic compounds on pellets in a rotary coating machine, coating pan or the like, owing to the stickness of the resin, the amount of coating is a few percent (based on the weight of the pellet), and the coated particles are adhesive to yield block masses, no separated particles being obtained. It is also impossible to coat the particles with a uniform thickness of resin. Since the said particles are not uniformly coated with resin, and a greater part of the resin is absorbed into the fertilizer granules, the formed film possesses many pin holes. Accordingly, when such granulated fertilizer is eluted in water, the nutrients are readily dissolved similar to uncoated granulated fertilizer.

For instance, a granulated fertilizer was charged into a rotary coating machine and was coated with 10% resin by spraying 20% vinylite VYHH (vinylchloride-vinylacetate copolymer (80:20) (Union Carbide Co., Ltd.)) solution in methyl ethyl ketone-toluene mixture, and after evaporating the solvent the vinylite VYHH coated fertilizer granules were adhesively joined together to give larger lumps. In such cases the following process is known, which comprises spraying the thermoplastic or thermohardening resin powders, and covering the adhesive granule to separate the same in the form of a mass covered with powder.

Further, there is another process wherein the surface of such powdered granules may be melted in the gaseous phase by dropping them through a heated cylinder. In practice, coated granulated fertilizer prepared by such melting method in the gaseous atmosphere is not effective due to the fact from 80 to 90% of the nutrients are eluated after one coating treatment. Further, even after from three to four coating treatments, 20 to 30% of the nutrients may be eluated. It is observed microscopically that such melt-treated granules have many pin holes and bubbles on the surface. Additionally, the repetition of the coating and the increase of the coating material cause many troubles in their preparation.

According to a separating process with a heated or nonheated centrifugal rotary plate, the desirable coated pellet form products are obtained by dipping the pellet form products in various resin solutions, removing the pellet form products upon completion of thorough coating with the resin solution, and dropping the coating pellets on the heated or nonheated rotary plate to be spread.

According to the above method, it is possible that uniformly resin-coated pellets are obtained with one coating treatment. However, in case of the roughness (unevenness) of the surface (even if uniformly coated with resin layer), pin holes are formed through which the ingredients may be leached. Consequently, it is difficult to impart the gradual availability to the pellet form product by such process.

An object of the present invention is to provide a coated pellet product having low water-solubility and antihydroscopic properties. Another object of the present invention is to provide a multi-layer-coating process for preparing uniformly coated pellets. Stil other objects of the present invention will become apparent from the following description.

According to the present invention, there is provided a process for preparing the low water solubility coated pellets, comprising coating the pellets with a first layer containing at least one liquid substance selected from the group consisting of thermosetting thermoplastic resins, subsequently covering the coated pellets before being dried and solidified with a thermo-plastic or thermosetting powdered substance as a second layer having a smaller particle size than the pellet; further dipping the covered pellets into a heated liquid containing at least one substance selected from the group consisting of thermoplastic resins, and waxes, whereby the second layer is melted in the liquid phase to form a uniform melted layer and at the same time the third layer of the resin is formed, and successively spreading the resulting coated pellets on a rotating heated or nonheated centrifugal rotor before being cooled and solidified, followed by isolating the pellets thus prepared.

The objects to be coated are exemplified as follows:

Fertilizers such as nitrogeneous fertilizers, phosphoric fertilizers, potassium fertilizers and mixtures thereof.

Pesticides such as benzene hexachloride, 1,2,3,4,10,10-hexachloro-6,7-epoxy - 1,4,4a,5,6,7,8,8a - octahydro-1,4-endo, exo-5,8-dimethano-naphthaline chemicals;

Plant growth regulators such as 2,4-dichlorophenoxy-acetic acid, 2-methyl-4-chlorophenoxyacetic acid, pentachlorophenol and trichloroacetic acid.

Further, the grain size of the material to be coated is preferably of the order of 0.5 mm.–10 mm.

Among the liquefied resins to be used for the 1st coating layer in the present invention, for example, are the following thermoplastic or thermosetting resins; (liquefied resin solution, preferably, of high concentration and of low viscosity in the solvents of aromatic or aliphatic esters, ketones and the like); such as, vinyl resins (polymers or copolymers of vinylchloride, vinylacetate, and vinylidene chloride, vinylchloride-acrylonitrile copolymer, vinylchloride-diethylfumarate copolymer, vinylidene chloride-acrylonitrile copolymer, vinyl chloride-isobutyl vinylidene chloride copolymer); styrene resins (styrene polymer, α-methyl styrene polymer, styrene-acrylonitrile copolymer, styrene-butadiene copolymer, styrene-divinylbenzene copolymer, styrene-vinylidene chloride copolymer and the like), acryl resins (polymer or copolymer of acrylic acid ester or methacrylic acid ester, copolymers of acrylic acid ester and other monomers, such as acrylic acid ester-butadiene copolymer and the like), cellulose resins (nitrocellulose, acetylcellulose, diacetylcellulose, triacetylcellulose, ethyl cellulose, benzyl cellulose, carboxymethyl cellulose and the other cellulose derivatives), petroleum resins (polymers of aromatic olefins and diolefins having 9 to 11 carbon atoms), alkyd resins (condensation products of polyalcohols and polybasic acids), polyamide resins, melamine resins and the like; binary component type fluid resins, such as polyurethane resins (urethane bond containing polymers prepared from a mixture of high molecular liquid compound or low molecular liquid compound having active hydrogen, such as polyols, polyamine and the like and high molecular liquid compounds or low molecular liquid compounds having more than 2 active radicals, such as isocyanate radicals), polyester resins (polymer consisting of polybasic acids and polyols, copolymers consisting of unsaturated alkyd resins and monomers having vinyl radicals and the like), epoxy resins (hardening products consisting of condensation polymers of epichlorohydrin and bisphenols and amino derivatives or polyamide resins). Further, as thermosetting solutions are phenol resins, urea-formaldehyde resins and the like.

Thus, in the present invention one or more kinds of resins mentioned above can be used, and moreover, the aqueous emulsified resin solution having vinyl resins, styrene butadiene resins, acryl resins, acrylonitrile resins and the like are also useful. Further, the thermoplastic resins used in the present invention include resin, shellac, agar-agar and gum arabic. Also, there may be used proteins such as gelatin, casein, albumin and the like. The proper coating is added to the pellets and mixed thoroughly the proper amount of the resin required for uniformly to make the surfaces of the pellets damp. In this case, coating is variable due to the pellet-diameter, the surface unevenness, the pellet material and the like, and also due to the composition of each liquefied resin.

For example, when granulated ammonium sulfate-phosphate of from 8 to 9 mesh is used with a resin solution containing 70 to 80% non-volatile constituents having a viscosity of 2000 to 3000 cp., a resin solution containing 3 to 4% (by weight) of solid resin can satisfactorily cover the granulated fertilizer.

Further, in this case, the sticky resin solution suitable for the pellet must be preferably used as the first layer coating resin solution. As stated above, before evaporating the solvents and hardening the resin solution, the thermoplastic and thermosetting resin powder is applied as a second layer on the first layer and then the adhesive blocks of pellets can be converted to fine pellets. Furthermore, it is desirable that the granular size of the thermoplastic and thermosetting resin powder must be smaller than that of the pellet form products, and a range from 5 to 200 mesh is preferable.

Among the thermoplastic resins usable in this case and diolefins having 9 to 11 carbon atoms), vinyl resins (polyvinyl chloride, polyvinyl acetate, polyvinylidene chloride, and the like), styrene resins (polystyrene, poly α-methyl styrene, and copolymers and derivatives thereof, such as copolymers of styrene-acrylonitrile, styrene-butadiene, and the like), acryl resins (polymers or copolymers of acrylic acid esters or methacrylic acid esters and the like), polyester resins (especially, lower molecular polyester resins), powdered polyester resins and the like. Further, the thermosetting resins are phenol resins, urea-formaldehyde resins and the like, and usable natural resins are rosin, shellac, rosin esters and powdered derivatives thereof. The preferable resins in the every pellet form product are varied due to their heat-resistance, but resins having lower molecular weight and a melting point of about 50 to 150° C. are preferable.

As mentioned above, the granulated products having the second powdered resin layer covered on the first liquefied resin layer are heated or allowed to stand for several hours, and the said second powered resin layers are completely united with the first liquefied resin layer. When the above process is not completely performed, the object of the coating process cannot be obtained. In this case, it is desirable that the firm union between the first layer and the second layer be obtained by drying at a temperature below the melting point of the second resin powder.

As mentioned above, the pellet form products coated with the first layer and the second layer are dipped in the fused liquefied resins or fused wax and then the second granular resin layer is melted, followed by coating the said fused resin or wax as the third layer.

The above mentioned fused liquefied resin for the third layer includes natural products (e.g., rosin, shellac, rosin and their derivatives), petroleum resins (e.g., polymers of aromatic olefins and diolefins having 9 to 11 carbon atoms), poly styrene resins, copolymers of styrene-acrylonitrile, styrene-butadien, styrene-vinyl chloride and the like, acryl resins (polymers or copolymers of acrylic acid esters or methacrylic acid ester), cellulose resins (nitro cellulose, cellulose acetate, ethyl cellulose and the like), urethane resins, epoxy resins, polyester resins and the like, and particularly resins having lower molecular weights are most preferable. Further, the viscosity of the resins are advantageously lowered by adding a small amount of diluent of below 300 cp. at 100 to 150° C. Thus, depending on the amount of the diluent, the length of the cooling cylinder used in the following step is varied. Further, wax fatty acids, fatty acid esters and the like are usable instead of the diluent. Additionally, wax alone or wax added with other compatible resins, such as vinylacetate-ethylene copolymers, ethylene polymers, styrene polymers, petroleum resins and the like in an amount of 5 to 20% are also useful to improve the hardness of the surface and moisture permeability. These waxes include the mineral waxes, such as, paraffin wax, vaseline wax, Utah wax, Montanous wax and the like. Further, fatty acids and fatty acid esters can be used instead of waxes.

Thus, the second powdered resin layer is partially or completely melted in the hot fused resin and any unevenness and pin holes on the surface of the coated layers can be completely filled with the 3rd fused resin layer.

Further, before being cooled and solidified to larger lumps, the soft melted pellets are centrifuged with a heated or nonheated rotary plate to yield cooled and solidified coated pellets.

Above all, according to the liquid phase fused process of the present invention, the above mentioned undesirable results, such as the formation of pin holes and appearance of the surface unevenness, can be completely improved with a single treatment, and the amount of coating, as desired, is able to be varied freely, and a coated pellet having an effective coating is obtainable.

It was determined that from 5 to 6% of the said coated granular fertilizer in the present invention may be eluted into water after one month of elution, and it was confirmed to be effective for the maintenance of the fertilizer stability during a prolonged period.

The process for preparing the coated pellet form product in the present invention are illustrated in the following examples:

EXAMPLE 1

500 g. of granulated high analysis compound fertilizer (Tohoku Hiryo Co., No. 21, termed "ammonium sulfate-phosphate") was introduced into an automatic rotary mixer (Universal Mixing-Agitator, Type 5DM, Shinagawa Seisakusho), to which was added 40 g. of a solution containing polyurethane resin, and completely agitated, the said solution being prepared by addition of 40 parts of Desmophen #1100 (a polyester resin made from 3 mol of adipic acid, 2.1 mol of hexanetriol and 2.1 mol of butanediol, trade name by Farbenfabriken Bayer A.G.) to 60 parts of 75% Desmodur L (an isocyanate prepolymer made from 1 mol of trimethyl propane and 3 mol of tolylenediisocyanate, trade name by Farbenfabriken Bayer A.G.) solution in ethyl acetate, followed by uniform agitation. After coating with the polyurethane solution for from 3 to 4 minutes, there was added to the resulting particles powdered polyol X-450 (a polyester resin of the Shell Chemical Co. and having a M.P. 90-100° C., 100-200 mesh) under agitating. Thus, each particle was separated individually on the completion of coating the surface with the polyol powder. That is, when the said surface was completely coated with polyol powder, the resulting particles were collected, and the unreacted polyol powder was removed by passing through a sieve. The granulated high analysis fertilizer coated with polyol powder was added to fused paraffin and the second layer (polyol layer) was melted in the liquid phase under vigorous stirring. Further, the paraffin layer was again formed under uniform stirring as mentioned above. Then, the said grandular portion was separated from the fused paraffin by filtration, spread while still soft by a centrifugal rotor and allowed to cool and solidify.

The final product obtained according to the present invention is a low water-solubility granulated high-analysis fertilizer, with a polyurethane-resin layer as the first layer, a polyol layer as the second layer and a paraffin layer as the third layer having 19.2% in the coating amount. Since the polyol of the second layer is melted at 90° C., it is desirable that the paraffin solution be kept at from 90 to 100° C. The rate of elutriation in water of the said product is only 4.5% for one month.

EXAMPLE 2

To 500 g. of 25% BHC-pellet (Heiwa Kato Co., Ltd.), 40 g. of Petrosin No. 80 (a petroleum resin in 75% xylene solution; trade name by Mitsui Petroleum Chemical Co.) was added and completely mixed under stirring to coat the surface of the pellets uniformly. Then, 300 g. of cumarone resin powder (M.P. 80-100° C., 100-200 mesh) was added to coat each pellet under stirring, and the resulting pellets were separated individually and coated again thoroughly with the cumarone resin powder, and the unreacted portion thereof was removed by passing through a sieve. The thus contained 25% BHC-pellet coated with cumarone resin powder was added to fused paraffin and the cumarone resin powder of the second layer was melted under stirring. On further uniform stirring, there was formed a paraffin layer on the surface of the pellet as a third layer. Then, the pellets thus obtained were separated from the fused paraffin by filtration, spread on a heated or nonheated centrifugal rotor while still soft and allowed to cool and solidify. Since cumarone resin melts at 100° C., it will be desirable that the fused paraffin be kept at 100-110° C.

The 25% BHC-pellet obtained is a very gradually available and durable pellet-form agricultural chemical with the coatings composed of the first petroleum resin layer, the second cumarone resin layer and the third paraffin layer. In this case, the amount of the coatings is 18.2%. The effect of the pellet in the present invention appeared on a rice field test after spreading for from 15 to 20 days.

EXAMPLE 3

Following the procedure of Example 2, but substituting a sodium salt of PCP hereafter referred to as PCP-Na-pellets (Heiwa Kako Co.), 60 g. of cumarone resin solution and Pretrosin #80 (M.P. 95-105° C., 100-200 mesh: Mitsui Petroleum Chemical Co., Ltd.) for 25% BHS-pellet, 40 g. of petroleum resin solution and powdered cumarone, respectively, there was obtained PCP-Na-pellets with three-layered coatings. Since the petroleum resin used here melts at 95° C., it is desirable that the fused paraffin be kept at from 95 to 105° C.

The resulting PCP-Na-pellet has low water-solubility. The amount of the coating is 15% (based on the weight of the final product).

When the coated PCP-Na-pellets were spread on a rice field, the activity thereof appeared on the third day, its maximum activity appearing on the fourth day, and it continued over a month with gradual decrease.

The conventional PCP-Na-pellets were readily decomposed two days after spreading and became ineffective.

EXAMPLE 4

Following the procedure of Example 1, but substituting granulated high analysis compound fertilizer (Mitsubishi Chemical Industries, Ltd., abbreviated as "granulated high analysis compound fertilizer 16–16–16"), 60 g. of a 20:80 vinyl acetate-acrylate copolymer and powdered polyethylene PS–3000 (Mitsubishi Petro-Chemical Co., Ltd) (softening point 90–100° C., 50–60 mesh) for the granulated high analysis mixed fertilizer, polyurethane resin solution and polyol, respectively, there was obtained a low water-soluble granulated 16–16–16 fertilizer coated with the first vinyl acetate-acrylate resin layer, the second polyethylene layer, and the third paraffin layer, the total amount of coating being 25%.

The rate of elutriation in water of the said product is only 3.2% during one month.

EXAMPLE 5

Following the procedure of Example 2, but substituting granulated high analysis compound fertilizer 16–16–16, 30% solid vinylite VYHH solution in methyl ethyl ketone-toluene mixture and powdered polyethylene (same products as Example 4) for the granulated high analysis mixed fertilizer, polyurethane resin solution and polyol powder, respectively, there was obtained a low water-soluble granular fertilizer, having the first VYHH layer, the second polyethylene layer, and the third wax layer, the total amount of coating being 14.1%.

EXAMPLE 6

To 300 g. of granulated high analysis compound fertilizer 14–12–9 heated at 80° C. was added 30 g. of a heated saran resin solution (Dow Chemical Co., F–220 in MEK/toluene mixture), and completely mixed to coat uniformly the surface of the granule. The resulting mixture was covered with a powdered copolymer of vinyl chloride-vinyl acetate resin (Japan Zeon Co., 427–S, softening point 120–130° C., 50–100 mesh), and the excess of the resin was removed by passing through a sieve.

The thus coated granular fertilizer was added to a fused cumarone resin solution, thereby the vinyl chloride-vinyl acetate copolymer was melted in a liquid phase and simultaneously the third cumarone layer was formed. Then, the resulting granules were dropped on a centrifugal rotor to be spread and allowed to cool and solidify.

There was obtained a low water-soluble granular fertilizer with a coating consisting of the first saran copolymer layer, the second vinyl chloride-vinyl acetate resin layer, and the third cumarone resin layer, the total amount of coating being 15.1%.

EXAMPLE 7

500 g. of granulated high analysis compound fertilizer 14–17–13 (Mitsubishi Chemical Industries, Ltd.) was charged into a mixer, to which was added 40 g. of polybest-clear (polyester resin solution, a product of Dai Nippon Toryo Co., Ltd.), and completely agitated. After coating with the polyester solution for from 3 to 4 minutes, the resulting particles were combined with 300 g. of powdered rosin (M.P. 60–70° C., 100–200 mesh) under agitation to cover the surface with the rosin powder.

On the completion of coating the surface with the powdered rosin, each particle was removed from the unreacted powdered rosin by passing through a sieve. The polyester resin-rosin powder coated granulated high analysis compound fertilizer 14–17–13 was added to a fused solution (80 parts of paraffin wax-20 parts of Elvax #250) (ethylene-vinyl acetate copolymer, Du Pont Co.), at 110–110° C., whereby the second rosin powder layer was melted in the liquid phase and further the third paraffin-Elvax resin layer was formed. Then, the particles were separated from the fused solution (paraffin-Elvax #250) by filtration, and spread while soft on a heated or nonheated centrifugal rotor to cool and solidify. The final product thus obtained were granules having the first polyester resin layer, the second rosin layer, and the third paraffin-Elvax layer, the amount of coating being 19.2%. As a result of a dissolving test, it was determined that the dissolving rate was 3.2% for one month, indicating that the coated granular fertilizer of the present invention was a very low water soluble granular fertilizer.

EXAMPLE 8

500 g. of granulated high analysis compound fertilizer 16–16–16 was charged into a mixer in which was added 50 g. of Acrose #1000 (acryl nitrocellulose lacquer, Dai Nippon Toryo Co., Ltd.) and completely agitated. After coating the surface with Acrose #1000 solution for from three to four minutes, the resulting particles were added to 300 g. of polyol X–450 powder (M.P. 90–100° C., 100–200 mesh) under agitation. After each particle was separated individually upon the completion of covering with polyol X–450, the excess of the polyol X–450 powder was removed by passing through a sieve. Then, after cooling, the particles were added to a fused rosin solution kept at 90–100° C., and the polyol X–450 of the second layer was melted while the third layer of the rosin was formed under stirring. Then, the fused rosin solution was filtered off.

By spreading the particles on a heated or nonheated centrifugal rotor before they are cooled and solidified to larger lumps, there was obtained, after cooling and solidifying, coated granules having the first acrylic resin layer, the second polyol layer, and the third natural rosin layer. The coatings amounted to 22%, and the rate of elutriation in water was 6.8% for a month.

EXAMPLE 9

To 500 g. of granulated high analysis compound fertilizer 14–17–13 was added 60 g. of PL varnish (phenolic resin alcohol solution, Dai Nippon Toryo Co., Ltd.), which was coated uniformly on the surface of the fertilizer while stirring, and then to the resulting particle was added powdered saran resin (saran F–220, softening point 110–120° C., 50–100 mesh; Dow Chemicals Co.) to cover the surface of the particle. After separation, the particle obtained was added to a fused paraffin solution (prepared by addition of 5 parts of chlorinated paraffin to 95 parts of paraffin wax, by weight), wherein the solution is kept at 110–120° C. Thus, the saran resin was melted in the fused phase, and simultaneously plasticized by the fused chlorinated paraffin to form the second and third plastic transparent coatings. After separation the coatings amounted to 16.6%, and the rate of elutriation was 4.5% for a month.

EXAMPLE 10

500 g. of granulated high analysis compound fertilizer 14–12–9 (Mitsubishi Chemical Industries, Ltd.) was charged into a mixer, to which 60 g. of PL varnish (phenolic resin alcohol solution, Dai Nippon Toryo Co., Ltd.) was added to coat uniformly the surface of each particle under agitating. Then, a powdered ABS resin (Kaneace B–11, softening point 100–110° C., 50–100 mesh: Kanegafuchi Chemical Co., Ltd.) was added to cover the surfaces of the resulting particles. After separation, the particles were introduced into a fused petroleum resin solution (Petrosin #80; Mitsui Petroleum Chemical Co.), whereby the powdered ABS resin was melted and simultaneously coated on the surface forming the third layer. Then, the particles thus obtained were separated from the fused petroleum resin by filtration, spread on a centrifugal rotor while still soft, and allowed to cool and solidify.

The particles thus obtained form a low water-soluble granular fertilizer coated with the first phenolic resin layer, the second ABS resin layer, and the third petroleum resin layer. The fused petroleum resin used herein is kept at 100–120° C., and the addition of about 5% of mineral spirit to the fused resin is preferable for workability.

The amount of the coating was 16.2%, and the rate of elutrication within a month was found to be 4.8%.

EXAMPLE 11

500 g. of pellet form agricultural chemical, pentachloronitrobenzene was charged to a vessel, to which was aded 60 g. of PL varnish (as described in Example 9) and thoroughly mixed. After completion of the forming of a uniform coating on the surface of the pellets, they were covered with 300 g. of powdered phenolic resin (Sumilite-resin PR225, M.P. 150–160° C., 100–200 mesh: Sumitomo-Durez Co., Ltd.), and the excess of Sumilite resin was separated. Then, the particle obtained was stirred in a fused solution (composed of 80 parts of wax and 20 parts of polyethylene) at 130–150° C. for 3–4 minutes, whereby the second thermally curable resin was melted to cure and the third wax-polyethylene layer was formed. The resulting particles were separated from the hot solution, followed by spreading by means of a heated or non-heated centrifugal rotor as described above.

The particles thus obtained constitute a very gradually available pellet-form agricultural chemical coated with the first phenolic resin layer, the second phenolic resin, and the third wax-polyethylene layer.

The amount of the coating is 15.4%. After spreading the pellet form agricultural chemicals on a rice field, activity appeared on about the third day, and continued for about 15 days following.

EXAMPLE 12

500 g. of 25% BHC-pellet was introduced into a mixer, to which was added 60 g. of polyester resin solution (as described above) and agitated. On completion of the coating of the particles with the polyester resin, the resulting particles were covered on the surface with 300 g. of powdered phenol resin (Sumilite resin PR219, M.P. 90–100° C., 100–200 mesh: Sumitomo-Durez Co., Ltd.). After uniform covering, the particles were separated from the excess of powdered phenol resin by passing through a sieve. The particles thus obtained were added to fused styrene resin at 130–140° C., whereby the phenol resin powder was melted and cured, and the particle was coated with the third styrene resin layer. The particles were separated from the hot solution by filtration, followed by spreading by means of a heated or nonheated centrifugal rotor as described above. The particles thus obtained are in the form of very gradually available pellet-form agricultural chemicals coated with the first polyester resin layer, the second resin layer and the third styrene resin layer, the total amount of coating being 25%. After spreading on a rice field, the activity of the pellet appeared on about the 10th–15th days.

EXAMPLE 13

500 g. of PCP-Na-pellet (Heiwa Kako Co.) was introduced into a mixer, to which was added 60 g. of Piccotex 120 solution (styrene copolymer resin, Esso Standard Oil Co.) and completely agitated to coat the surface of the pellet uniformly. Then, to the coated pellet was added 300 g. of powdered petroleum resin, Petrosin #80 (Mitsui Petroleum Chemical Co.) under agitation, and the particles were separated from one another and the unreacted petroleum resin powder was removed by passing through a sieve.

The PCP-Na pellets covered with the powdered petroleum resin was added into fused rosin and the petroleum resin was melted in the liquid phase under stirring, while the third layer of the rosin was formed. Then, the pellet thus obtained was separated from the fused rosin by filtration, spread by means of a heated or nonheated centrifugal rotor before being cooled and solidified, and allowed to cool and solidify. In this case, since the petroleum resin melts at 95° C., it is preferable that the fused rosin is kept at 95–105° C. Further, it is found that concerning workability, the addition of 5–10% of mineral spirit to the rosin is desirable.

The PCP-Na-pellets thus obtained are low water soluble PCP-Na-pellets coated with the first styrene resin layer, the second petroleum resin layer, and the third natural resin layer. The amount of the coating of the pellet is 19.8%. The activity of the coated PCP-Na-pellet appeared on the third day, reached a maximum on the fifth day, and continued for the following 25 days with gradual decrease.

EXAMPLE 14

500 g. of granulated urea-fertilizer (Mitsubishi Chemical Industries, Ltd.) was charged into a mixer, to which 50 g. of alkyd-nitrocellulose lacquer (Dai Nippon Toryo Co., Ltd.) was added and coated uniformly on the surface of the granule under agitation.

Then, the resulting particles were mixed to cover the surface with cumarone resin powder (M.P. 80–100° C., 100–200 mesh), and separated. The separated granules were added into a fused solution, which was separately prepared by addition of 10–15% of mineral spirit diluent to fused polyester resin (polyol #450) and adjusting the viscosity to 250–300 cp. at 120° C. Thus, the cumarone resin powder of the second layer was melted, and simultaneously the third layer of the said fused polyester resin was formed. The resulting particle was filtered, centrifuged, while unsolidified, and allowed to cool and solidify. Here, compared with wax alone or wax added with other compatible resins, the polyester resin of the third layer cools more slowly, and requires a longer cooling cylinder. The particle thus obtained form a low water-soluble granular fertilizer having the first layer of nitrocellulose, the second layer of cumarone resin and the third layer of polyester resin.

EXAMPLE 15

500 g. of granulated urea-fertilizer (Mitsubishi Chemical Industries, Ltd.) was charged into a mixer, to which 25 g. of urethane resin (used in Example 1) as the first coating was added to cover uniformly the surface of the granule under agitation. Then, the resulting granules were covered on the surface with cumarone resin powder (M.P. 120–140° C., 100–200 mesh) as the second coating, and separated. The separated granular urea-fertilizer was added a fused solution prepared by addition of 20 parts of oil-soluble phenol resin (Sumilite 209; Sumitomo Bekelite Co.) to 80 parts of wax, whereby the second cumarone resin layer was melted and simultaneously the third layer of the said fused wax-phenol resin was formed. The resulting granules were filtered, centrifuged while unsolidified and allowed to cool and solidify. The granules thus obtained form a low water-soluble granular urea fertilizer coated with the first layer of urethane resin, the second layer of cumarone resin, and the third layer of paraffin mixed with phenol resins.

EXAMPLE 16

500 g. of crystalline ammonium sulfate fertilizer (Mitsubishi Chemical Industries, Ltd.) was charged into a mixer, to which 40 g. of soy bean oil modified alkyd resin was added to cover uniformly the surface of the particles under agitation. The resulting particles were separated by adding polyol #450 (polyester resin) powder (same products as Example 1). Then, the separated crystalline ammonium sulfate particles were introduced into a fused solution (composed of 80 parts of wax and 20 parts of polyethylene of lower molecular weight, e.g. 1000–5000). Thus, the polyol #450 powder of the second layer was melted in the fused solution and simultaneously the third layer of the said fused resin was formed. Then, the resulting particles were filtered, spread by a centrifugal rotor while soft and allowed to cool and solidify as mentioned above.

The particles thus obtained are low water-soluble crystalline ammonium sulfate coated with the first alkyd resin layer, the second polyester resin layer, and the third wax mixed with polyethylene.

EXAMPLE 17

Following the procedure of Example 16, but substituting oil modified polyurethane resin (Spekel F–77: Spencer Kellogg Co.), cumarone resin powder same products as Example 2) and fused alkyd resin mixed with wax for the soy bean oil modified alkyd resin, polyol #450 and fused wax and polyethylene, respectively, there was obtained a low water-soluble crystalline ammonium sulfate coated with the first polyurethane oil layer, the second cumarone resin layer, and the third alkyd mixed with wax layer.

EXAMPLE 18

Following the procedure of Example 16, but substituting urethane resin (moisture cured type), cumarone resin powder (same products as Example 2) and fused paraffin mixed with petroleum resin, for the soy bean oil modified alkyd resin, polyol #450 and fused wax mixed with polyethylene, respectively, there was obtained a low water-soluble crystalline ammonium sulfate coated with the first urethane resin layer, the second cumarone resin layer, and the third paraffin-petroleum resin.

EXAMPLE 19

To 500 g. of 25% BHC-pellets was added 30 g. of alkyd nitrocellulose lacquer (Dai Nippin Toryo Co. Ltd.) and completely mixed to coat the surfaces of the pellets. Then, 300 g. of cumarone resin powder was added and each particle was separated individually. The unreacted portion of cumarone powder was removed by passing through a sieve. The 25% BHC-pellet covered with cumarone powder thus obtained was added to a fused solution composed of 90 parts of paraffin wax and 10 parts of Elvax #150, and stirred until the covering cumarone powder of the second layer was melted and the third layer of the wax and Elvax #150 was formed. The resulting particles were separated from the fused solution, and spread while soft by centrifugal rotor to cool and solidify The 25% BHC-pellets form gradually available and durable pellet-form agricultural chemicals coated with the first nitrocellulose-alkyd resin layer, the second cumarone layer, and the third wax-Elvax #150 layer. The amout of the coating is 15.0%.

EXAMPLE 20

To 500 g. of 25% BHC-pellets was added 20 g. of a 50% acryl-vinyl acetate copolymer solution in ethyl acetate:xylene (40:60) mixture (Dai Nippon Toryo Co., Ltd.) and thoroughly mixed to coat the surface of the pellet uniformly. Then, the particle was separated by addition of cumarone resin powder (same products as Example 2), and the agricultural chemicals covered with the first and second layers was added to a fused solution composed of paraffin wax and Elvax #150 (as described above in Example 19), resulting in fusion of the second layer and formation of the third layer simultaneously. Then, after separation from the fused solution, the resulting particles were spread by a centrifugal rotor, while soft, to provide a gradually available and durable pellet form agricultural chemical coated with the first acryl-vinyl acetate resin layer, the second cumarone resin layer, and the third wax-Elvax #150 layer, the total amount of coating being 18%.

EXAMPLE 21

A mixture composed of 500 g. of 25% BHC-pellet and 40 g. of the acryl-vinyl acetate copolymer as used in the first layer of Example 20 was treated as in Example 20. In this procedure, by varying the amount of acryl vinyl acetate solution added (for the first layer) the amount of the coatings reached as high as of 33%, and a very gradually available and durable pellet form agricultural chemical was obtained.

EXAMPLE 22

To 500 g. of 25% BHC-pellet (as described above) was added 30 g. of the polyurethane resin solution (as described in Example 1) and coated uniformly on the surface. The resulting particles were separated by addition of cumarone resin powder (same products as Example 2), and then added to the fused solution of wax-Elvax #150 as described in Examples 19, 20 and 21, whereby the second layer was melted and the third layer formed simultaneously. The pellet form agricultural chemical obtained by cooling and solidifying the said granules is a gradually available and durable one coated with the first urethane resin layer, the second cumarone resin layer, and the third wax-Elvax #150 layer. The amount of the coating is 14%.

EXAMPLE 23

500 g. of granular fertilizer No. 21 (Mitsubishi Chemical Industries, Ltd.) was charged to a mixer, to which was added 60 g. of vinyl acetate emulsion resin and coated uniformly on the surface of the granule under agitation.

Then, to the resulting mixture was added 300 g. of polyol X–450 (polyester resin) powder and agitated thoroughly. After each granule was separated by covering the surface with polyol X–450 powder (same products as Example 1), the excess of the polyol X–450 powder was removed by passing through a sieve. Then, the granule coated with the first and second layers was introduced into the fused mixture (composed of 20 parts of oil soluble phenol and 80 parts of paraffin wax) kept at 90–100° C., whereby the second polyol X–450 layer was melted and the third layer of oil soluble phenol-paraffin wax was formed. Thereafter, the fused solution was filtered off. Before being cooled and solidified to larger lumps, each particle was spread by a centrifugal rotor and allowed to solidify. The coated granules thus obtained have the first vinyl acetate emulsion resin layer, the second polyol resin layer, and the third oil soluble phenol-wax layer. The amount of the coating is 19.5%, and the rate of elutriation for one month is found to be 22.3%.

EXAMPLE 24

500 g. of granulated high analysis fertilizer was charged into a mixer, to which was added 60 g. of a 30% gelatin solution in methanol:water (20:80) mixture and agitated thoroughly. After coating the surface with the gelatin solution in 3–4 minutes, the resulting granules were covered with cumarone resin powder (same products as Example 2), of which the excess was removed by passing through a sieve as described in Example 23. Then, the granules coated with the first and second layers were introduced into the fused mixture (composed of 30 parts of oil soluble phenol resin and 70 parts of paraffin wax) at 90–100° C., whereby the second cumarone resin layer was melted and simultaneously the third layer of the oil soluble phenol-paraffin wax was formed. Thereafter, the fused mixture was filtered off. Before being solidified to larger lumps, each particle was spread by a centrifugal rotor and allowed to cool and solidify. The coated granules thus obtained had the first gelatin layer, the second cumarone resin layer, and the third oil soluble phenol-paraffin wax layer. The amount of the coating is 21.0%, and the rate of elutriation for a month is found to be 32.7%.

The following tables show the results of tests on properties of the coated pellet form products of the present invention compared with that of the various conventional pellet form products.

Additionally the powdered resins illustrated in Examples 1 to 24 were arranged respectviely within a preferable range of particle sizes (mesh) by pulverization and screening. The melting point and softening point of the powdered resins were obtained by measurement with a melting point apparatus in which a capillary tube containing a sample was immersed in silicone oil which was slowly heated. The temperatures at which sample was softened and that at which it was melted were read with a thermometer.

by removing the moisture with filter paper. After 24 hours of standing in the dish at room temperature, the death rate of the insects was determined and evaluated in terms of BHC concentration. The relation between BHC concentration in water and the death rate are shown in FIG. 1 (cf. Nogyl-Seisan-Gijutsu, No. 7, p. 39, Dec. 25, 1962).

TABLE 1.—THE RATES OF ELUTRIATION OF VARIOUS COATED GRANULAR FERTILIZERS

| | Amounts of coating, percent | Rate of elutriation after | | | |
|---|---|---|---|---|---|
| | | Immediately | 1 Day | 7 Days | 30 Days |
| Coated fertilizer prepared in: | | | | | |
| Example 1 | 19.2 | 0 | 0 | 1.0 | 4.5 |
| Example 4 | 25.0 | 0 | 0 | 0.2 | 3.2 |
| Example 5 | 14.1 | 0 | 0 | 2.1 | 5.6 |
| Example 6 | 15.1 | 0 | 0 | 3.1 | 6.1 |
| Example 7 | 19.2 | 0 | 0 | 1.0 | 3.2 |
| Example 8 | 22.0 | 0 | 0 | 2.9 | 6.8 |
| Example 9 | 16.6 | 0 | 0 | 1.6 | 4.5 |
| Example 10 | 16.2 | 0 | 0 | 0.7 | 4.8 |
| Example 14 | 21.3 | 0 | 5.2 | 15.3 | 21.6 |
| Example 15 | 18.3 | 0 | 4.8 | 12.3 | 19.5 |
| Example 16 | 26.3 | 0 | 1.0 | 1.4 | 12.0 |
| Example 17 | 19.3 | 0 | 0.8 | 1.1 | 5.1 |
| Example 18 | 14.4 | 0 | 0.3 | 0.8 | 3.2 |
| Example 23 | 19.5 | 0 | 4.8 | 12.5 | 22.3 |
| Coated fertilizer, 1 coat (melted in gaseous phase) [1] | 10.8 | 0 | 88.5 | 100 | |
| Coated fertilizer, 2 coat (melted in gaseous phase) [2] | 23.1 | 0 | 32.5 | 92.2 | |
| Coated fertilizer, 3 coat (melted in gaseous phate) [3] | 31.2 | 0 | 24.2 | 45.6 | 100 |
| Product A (A.D.M.Co., U.S.A.: 14-7-7) [4] | 29.0 | 0 | 3.6 | 17.0 | 30.5 |
| Product B (A.D.M.Co., U.S.A.: 9-9-9) [5] | 28.7 | 0 | 20.4 | 33.2 | 90.2 |
| Fertilizer on a known process [6] | 1 | | 100 | | |
| Non-coated fertilizer A [7] | 0 | 100 | | | |
| Non-coated fertilizer B [8] | 0 | 100 | | | |
| Non-coated fertilizer C [9] | 0 | 100 | | | |
| Non-coated fertilizer D [10] | 0 | 100 | | | |

[1] The sample was obtained as follows: To 500 g. of granulated high analysis fertilizer No. 48 was added 40 g. of polyurethane resin solution and completely agitated, and then the resulting granules were separated from each other by adding polyol X-450 powder. Further, the separated granules were passed through a heated cylinder kept at 850–950° C. to melt in gaseous phase.
[2] The sample was prepared by twice repeating the procedure for coatings described in Note-1.
[3] The sample was prepared by repeating, three times, the procedure for coatings described in [1].
[4] Coated "Ammonium sulfate-phosphate" fertilizer.
[5] Coated "Ammonium sulfate-phosphate" fertilizer.
[6] The sample prepared by drying the granular high analysis fertilizer sprayed on the surface with the paints prepared by adding the proper amounts of mineral pigment to vinyl acetate emulsified polymeric solution and adjusting with water.
[7] Granulated high analysis fertilizer No. 48 (Tohoku Hiryo Co. Ltd.).
[8] "Ammonium sulfate-phosphate" (Tohoku Hiryo Co. Ltd.).
[9] Granulated high analysis fertilizer (Mitsubishi Chemical Industries Ltd., Japan).
[10] Crystalline ammonium sulfate fertilizer (Mitsubishi Chemical Industries Ltd., Japan).

(1) Method for test 20 g. of sample in a 300 ml.-beaker is mixed with 100 ml. of distilled water, and placed in a thermostat kept at the temperature of 20° C. and a relative humidity of 75% for 24 hours. Then, the mixture is filtered with a B-5 filter paper, and 25 ml. of the filtrate is pipetted into a dish and evaporated to dryness at 80–100° C. for about 3 hours, and the rate of elutriation is calculated from the weight of the residue.

(2) Solubility of coated BHC-granulated pellets in water (1) Experimental condition.—200 ml. of water was introduced in a large test tube (3.7 cm. in diameter, 25 cm. in height, and 230 ml. in volume) resulting in 21 cm. depth of water column in the test tube, to which was added 100 mg. of the coated BHC granulted pellets. After standing at room temperature for 24, 48, 120 hours respectively, each 5.0 ml. of aqueous liquid from the middle zone, i.e., 11 cm. in depth of the test tube bottom was pipetted, and the concentration of BHC was estimated.

Figure 2:
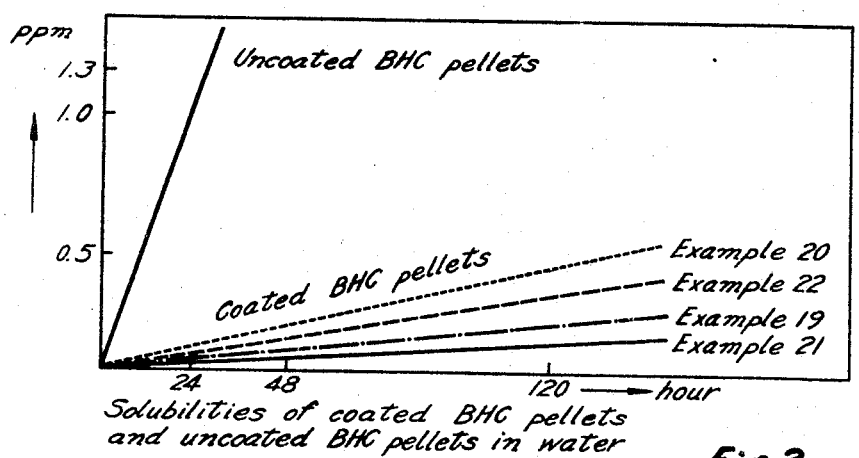

(2) Estimation of BHC in water (microbioassay).— Each 5.0 ml. of the aqueous diluted BHC solution was pipetted in a small test tube (1.4 to 1.5 cm. in diameter, 11.5 length), and to each test tube was added 20 insects (*Callosobruchus chinensis, Linne*), followed by closing the test tubes. After 2 minutes of vigorous shaking (BHC is absorbed into the insect skin during this treatment), the insects were collected by means of a sieve, followed (3) Solubility of coated BHC pellets.—As mentioned in the experiments (1) and (2), the solubilities of coated BHC pellets and uncoated BHC pellets in Examples 19, 20, 21 and 22 were estimated and the results obtained are shown in FIG. 2.

(3) Experiments for coated granulated high analysis fertilizer

Figure 3:
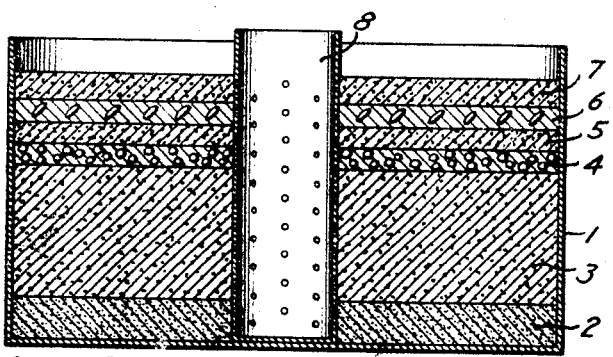

Materials and experimental condition: (i) Kings of used—volcanic ash soil (Kuroboku); (ii) Scale of experiment—2 Neubauer pots ($1 \times 10^{-4}$ as shown in FIG. 3) were employed; (iii) Experimental plants—10 seeds each of deccangrass or radish were layed in each pot, and were supplemented with the coated granulated fertilizer, as shown in FIG. 3; (iv) The amount of the coated granulated fertilizer is related in terms of nitrogen and is given in amounts of 20, 40, or 50 kg. In this case, since the ratio of $N:P_2O_5:K_2O$ for the composition of the coated granular fertilizer used in 13%:13%:13%, the amount of $P_2O_5$ given as well as that of $K_2O$ is equal to that of N.

The relative positions of soil, fertilizer and seed are shown in FIG. 3.

Numbers denoted in FIG. 3 are illustrated as follows:
1 Neubauer pot (1×10.4 are in volume)
2 Sand, 100 g.
3 Soil, 300 g.
4 Coated granulated fertilizer layer
5 Covering soil, 100 g.
6 Seed, 10 seeds
7 Covering soil, 56 g.
8 Glass tube having small holes to supplement water Deccan-grass (Amount of C.G.F.[1] added)

| | | | 10 kg. | | | | | 20 kg. | | | |
|---|---|---|---|---|---|---|---|---|---|---|---|
| | Percent coated | Percent eluated for 24 hours | No. of germination | | Deccan-grass cor stems | | Fresh weight after 39 days | No. of germination | | Deccan-grass cor stems | | Fresh weight after 39 days |
| | | | 5 days | 12 days | 25 days | 39 days | | 5 days | 12 days | 25 days | 39 days | |
| Sample: | | | | | | | | | | | | |
| A | 11.8 | 1.1 | 9 | 9 | 49 | 68 | 83 | 10 | 10 | 47 | 69 | |
| B | 20.6 | 2.8 | 10 | 10 | 46 | 75 | 64 | 9 | 9 | 48 | 72 | |
| C | 18.5 | 3.7 | 9 | 9 | 57 | 76 | 80 | 10 | 10 | 46 | 76 | |
| D | 21.0 | 0.2 | 9 | 9 | 39 | 54 | 25 | 10 | 10 | 46 | 64 | |
| E | 0 | 100.0 | 10 | 10 | 51 | 73 | 70 | 2 | 8 | 39 | 73 | |

| | 20 kg. fresh weight after 39 days | 30 kg. | | | | | 40 kg. | | | | |
|---|---|---|---|---|---|---|---|---|---|---|---|
| | | No. of germination | | Deccan-grass cor stems | | Fresh weight after 39 days | No. of germination | | Deccan-grass cor stems | | Fresh weight after 39 days |
| | | 5 days | 12 days | 25 days | 39 days | | 5 days | 12 days | 25 days | 39 days | |
| Sample: | | | | | | | | | | | |
| A | 113 | 9 | 9 | 38 | 60 | 73 | 10 | 10 | 28 | 59 | 29 |
| B | 57 | 10 | 10 | 48 | 69 | 57 | 10 | 10 | 42 | 53 | 28 |
| C | 73 | 10 | 10 | 51 | 70 | 72 | 10 | 10 | 39 | 63 | 50 |
| D | 35 | 9 | 9 | 42 | 59 | 56 | 9 | 9 | 48 | 64 | 58 |
| E | 40 | 0 | 1 | 23 | 47 | 7 | 0 | 2 | 5 | 0 | 0 |

RADISH (AMOUNT OF C.G.F.[1] ADDED)

| | 10 kg. | | | | | 20 kg. | | | | |
|---|---|---|---|---|---|---|---|---|---|---|
| | No. of germination | | Deccan-grass cor stems | | Fresh weight after 39 days | No. of germination | | Deccan-grass cor stems | | Fresh weight after 39 days |
| | 5 days | 12 days | 25 days | 39 days | | 5 days | 12 days | 25 days | 39 days | |
| Sample: | | | | | | | | | | |
| A | 9 | 9 | 16 | 20 | 25 | 10 | 10 | 17 | 20 | 39 |
| B | 10 | 10 | 18 | 22 | 34 | 10 | 10 | 17 | 17 | 19 |
| C | 10 | 10 | 18 | 18 | 32 | 10 | 10 | 15 | 19 | 18 |
| D | 10 | 10 | 16 | 19 | 22 | 10 | 10 | 17 | 21 | 24 |
| E | 10 | 10 | 20 | 22 | 33 | 5 | 7 | 13 | 13 | 6 |

| | 30 kg. | | | | | 40 kg. | | | | |
|---|---|---|---|---|---|---|---|---|---|---|
| | No. of germination | | Deccan-grass cor stems | | Fresh weight after 39 days | No. of germination | | Deccan-grass cor stems | | Fresh weight after 39 days |
| | 5 days | 12 days | 25 days | 39 days | | 5 days | 12 days | 25 days | 39 days | |
| Sample: | | | | | | | | | | |
| A | 9 | 9 | 15 | 16 | 20 | 10 | 10 | 13 | 14 | 8 |
| B | 10 | 10 | 17 | 9 | 12 | 10 | 10 | 8 | 10 | 6 |
| C | 10 | 10 | 14 | 15 | 12 | 10 | 10 | 14 | 13 | 6 |
| D | 10 | 10 | 19 | 19 | 30 | 10 | 10 | 19 | 20 | 34 |
| E | 1 | 0 | 0 | 0 | 0 | 0 | 0 | 0 | 0 | 0 |

[1] C.G.F. represents coated granulated fertilizer.

Sample (A): To 500 g. of granular fertilizer, ammonium sulfate-phosphate No. 48 was added 25 g. of polyurethane resins used in Example 1 as the first layer, and subsequently, by coating the said product with cumarone resin powder as the second layer and with paraffin as the third layer, sample (A) was prepared.

Sample (B): To 500 g. of granular fertilizer No. 48 was added 20 g. of the acryl resin-Paraloid B-66 composition as the first layer, and subsequently, by coating with cumarone resins as the second layer and with wa-Elvax #250-9/1 as the third layer, sample (B) was prepared similar to Example 8.

Sample (C): To 500 g. of granulated fertilizer No. 48 was added 20 g. of vinylacetate-crotonic acid polymer "Cestbien-020" (Nippon Celluloid Co., Ltd.) instead of vinylacetate-acryl resins as the first layer, and subsequently, by coating with cumarone resins as the second layer and with paraffin-Elvax #250 as the third layer, sample (C) was prepared similar to those in Example 4.

Sample (D) was prepared by coating the unfinished granule of sample (A) having only the first and second layers, with urethane resins as the third layer and cumarone resins as the fourth layer, and by further coating wax-Elvax #250-1/9 as the fifth layer.

Sample (E): Granulated high analysis fertilizer.

What we claim is:

1. A process for preparing low water-solubility, coated pellet-form products, said process comprising coating heated and softened pelletized products with a liquid substance comprising at least one thermoplastic or thermosetting resin or protein, covering the thus coated products while still hot and soft with a powdered resin selected from the group consisting of thermoplastic and thermosetting powdered resins having a particle size smaller than that of the pellets whereby the pelletized products coated with the first layer become separated from one another and at the same time a second layer composed of powder is formed on the first layer; immersing the pelletized products, thus coated, into a heated liquid comprising at least one member selected from the group consisting of thermoplastic resins and waxes whereby said second layer is melted or cured to form a uniform coating and at the same time a third layer composed of said heated liquid is formed on said uniform coating; and depositing the thus obtained pellets, while hot and soft, onto a centrifugal rotary plate thereby to dry said liquid third layer and separate the coated pelletized products from each other.

2. A process according to claim 1 wherein the pelletized products to be coated are agricultural chemicals.

3. A process according to claim 1 wherein the said pelletized products to be coated are fertilizers.

4. A process according to claim 1 wherein said resins of the second layer have a melting point of 50 to 150° C. and a particle size within a range of 50 to 200 mesh.

5. A process according to claim 1 wherein the resins of the third layer are of the binary component type, said process further comprising dipping the pellets with the third layer thereon into a curing agent to catalytically cure the resins of the third layer before the pellets are deposited on the centrifugal rotary plate.

6. A process according to claim 1 wherein at least one layer includes constitutive pigments or coloring pigments.

7. A process according to claim 1 comprising passing the pellets with the three layers thereon through a tube wherefrom they are deposited onto the centrifugal rotary plate.

8. A process according to claim 7 comprising cooling said tube and the pellets passing therethrough.

9. A process according to claim 7 comprising heating said tube and the pellets passing therethrough.

References Cited

UNITED STATES PATENTS

| | | |
|---|---|---|
| 3,223,518 | 12/1965 | Hansen. |
| 3,259,482 | 7/1966 | Hansen. |
| 3,264,088 | 8/1966 | Hansen. |
| 3,264,089 | 8/1966 | Hansen. |
| 3,295,950 | 1/1967 | Blovin et al. |
| 3,313,613 | 4/1967 | Green. |
| 3,313,615 | 4/1967 | Formaini. |

WILLIAM D. MARTIN, Primary Examiner

R. HUSACK, Assistant Examiner

U.S. Cl. X.R.

117—21, 62.2, 72, 100, 119.2, 119.6